(No Model.)
B. F. MANIER.
CAR TRUCK.
No. 409,993.   Patented Aug. 27, 1889.
2 Sheets—Sheet 1.
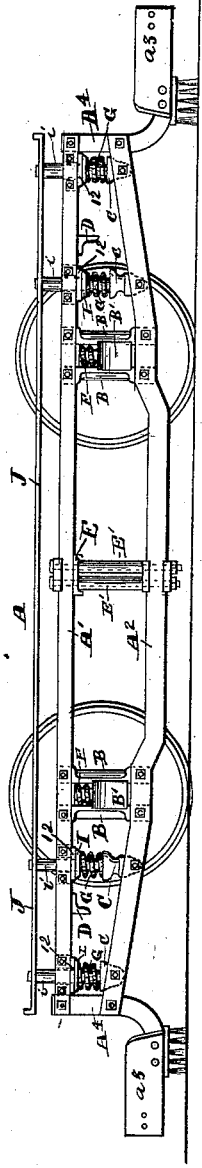
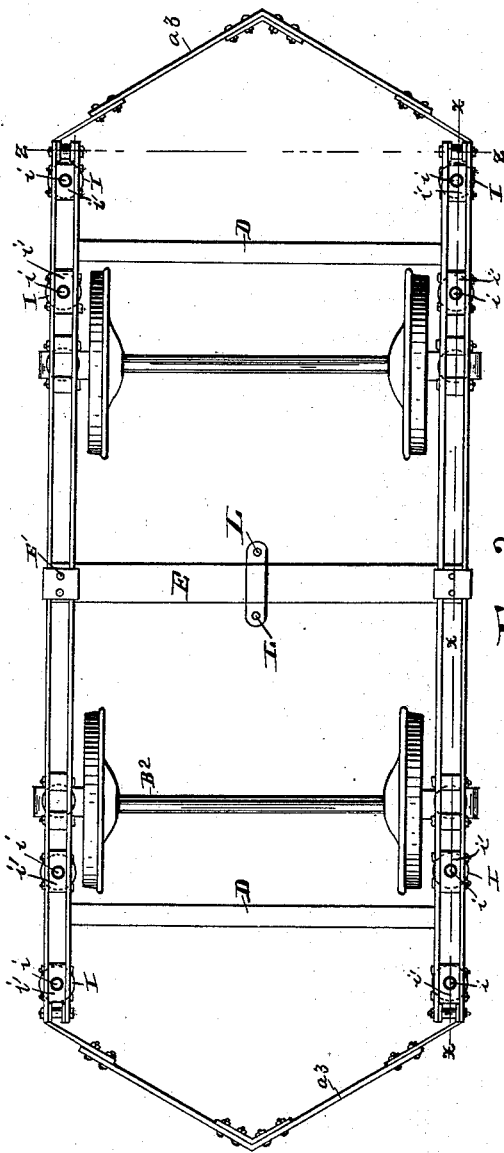
Witnesses:
P. L. Brooks
A. E. Dowell
Inventor:
B. F. Manier
By his Attorney T. H. Alexander (No Model.) 2 Sheets—Sheet 2.
B. F. MANIER.
CAR TRUCK.
No. 409,993. Patented Aug. 27, 1889.
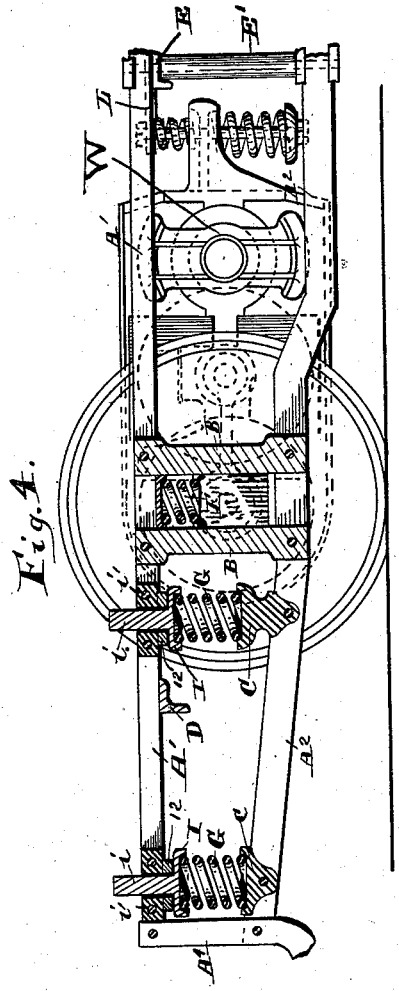
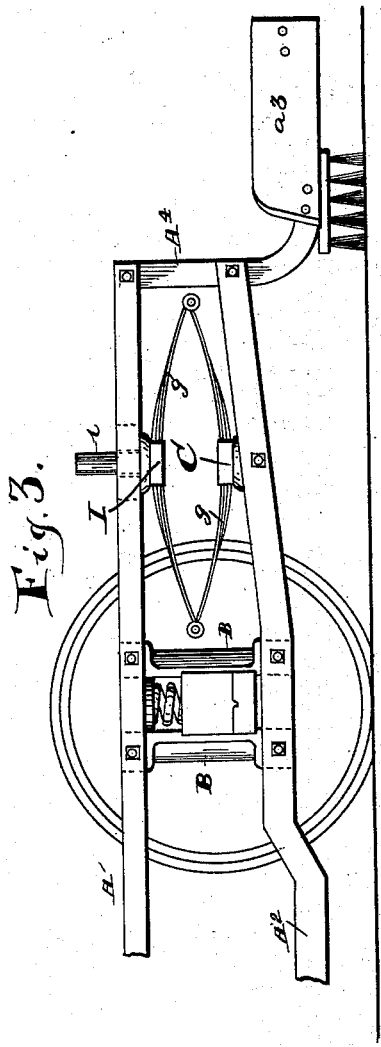
Witnesses:
P. L. Brooks.
A. E. Dowell.
Inventor
B. F. Manier
By his Attorney,
T. N. Alexander

UNITED STATES PATENT OFFICE.

BENJAMIN F. MANIER, OF TROY, NEW YORK.

CAR-TRUCK.

SPECIFICATION forming part of Letters Patent No. 409,993, dated August 27, 1889.

Application filed June 21, 1889. Serial No. 315,075. (No model.)

*To all whom it may concern:*

Be it known that I, BENJAMIN F. MANIER, of Troy, in the county of Rensselaer and State of New York, have invented certain new and useful Improvements in Car-Trucks; and I do hereby declare that the following is a full, clear, and exact description thereof, reference being had to the accompanying drawings, and to the letters of reference marked thereon, which form a part of this specification, in which—

Figure 1 is a side view of my improved truck for electric motors and tram or street cars. Fig. 2 is a plan view of the same. Fig. 3 is a detail sectional side view showing a modification of springs. Fig. 4 is a detail vertical sectional view through a portion of the truck on line $x\ x$, Fig. 2.

This invention is an improvement in trucks for street or tram cars, and is especially designed for use with electric motors. Its objects are to so construct the truck that open or summer car bodies or closed "box" bodies can be readily mounted thereon interchangeably, and wherein the body will be spring-cushioned on the truck independently of the cushioned mountings of the truck on the axles, the body-springs being exterior or outside of the car-axles at the ends of the truck, so that the rocking or oscillating movement of the body usual in ordinary cars will be obviated. Further objects are to so construct the truck that the motors will be readily accessible, and will be partially equipoised on the truck; and to these ends the invention consists in the novel construction and arrangement of parts of and in the truck, as will be hereinafter clearly described and claimed.

Referring by letters to the drawings, A designates the truck-frame, rectangular in plan, and composed of the compound upper and lower side bars $A'\ A^2$, suitably connected, and the transverse connecting-bars D D and E. Each compound bar $A'\ A^2$ consists of two flat metal bars set on edge and secured together by lateral bolts, as shown, the bars being separated, however, by interposed blocks or the ends of vertical uprights B B, which are securely bolted to the bars $A'\ A^2$, as shown, and keep said bars in proper relative position. The compound bars as thus constructed are light and very strong. By setting the flat metal bars edgewise they will withstand and support a great vertical strain or weight superimposed thereon, and by arranging them in pairs and staying them together laterally by the connecting bolts, as described, lateral flexing thereof is prevented. The upper bar $A'$ is straight, but the lower bar $A^2$ is depressed at center between the pairs of uprights B B, said uprights forming guides, between which move the journal-boxes $B'$ of the car-axles $B^2$, which are of ordinary construction. There are two axles to each truck, which are of the four-wheel class. F F designate coiled springs interposed between the boxes $B'$ and top bars $A'$, by which the truck is spring-cushioned and suspended on the axles. The bars D D are made of L angle-iron and bar E of U angle-iron, and all are securely bolted to the upper bars $A'$. The ends of bars $A'\ A^2$ are connected by vertical pieces $A^4$, and on the ends of the truck may be mounted fenders $a^3$, as shown.

On the lower bar $A^2$, between the uprights B B and the ends of the truck, are mounted stirrup-blocks C C, on which are supported springs, and upon these springs rest caps I I, having upstanding shanks $i$, that rise between the members of bar $A'$ and project above said bar. The shanks $i$ preferably move through openings in blocks $i'$, secured to bars $A'$, and are guided thereby. Upon said shanks $i$ are supported horizontal bars J, which are bolted thereto, and to said bars J the car-bodies can be readily fastened in any convenient manner, and car-bodies of different styles can thus be readily mounted on the same truck and as readily removed simply by unfastening bars J from the body or truck, as is obvious. Preferably I employ spiral springs G, as shown in Fig. 1, for supporting caps I; but, if desired, the elliptic springs $g$ could be employed, as shown in Fig. 3; or other forms of springs may be used, as found convenient and desirable, the particular form of spring not forming part of present invention.

It will be observed that if a car be mounted on bars J, as described, the weight thereof is transferred to the ends of the truck exterior to or beyond the axles, and consequently nearly beneath the ends of the body, and thereby the tendency of the body to rock or tilt is overcome. This oscillation of the body, which is very unpleasant, is noticeable in cars mounted on trucks wherein the body-springs are on both sides of the axles and near the center of the truck and body. This mounting of the body-springs forward of the axles I consider a special feature of my truck. The bars A' A² are connected at center by brace-bolts E' E'. Bar E is midway between the axles and in the center of the truck, and the motor-armatures W are partly suspended thereon at points L L and partly on the axles. The weight of the motors bearing on the center of the truck is partially balanced by the weight of the body on the ends thereof, so that a smooth and steady riding of the truck is obtained, as the side frames thereof are about equally loaded between and forward of the axles. The movement of the body of the truck-frame is entirely independent of the movement of the truck-frames on the car-axles; but the weight of both car body and truck is transferred to the axles through springs F F, and thus a complete spring-suspension of the body is obtained. The caps I I are preferably provided with cushioning-pads 12 12, to prevent jar and noise when the caps ride upward into contact with the under side of bar A'.

Having thus fully described my invention, I claim—

1. The combination, in a truck-frame, of the compound side bars A' A², composed of flat metal bars arranged vertically edgewise in pairs, and bolted together substantially as described, and the vertical uprights connecting said bars and the transverse connecting-bars, substantially as specified.

2. The combination, in a truck, of the side frames composed of side bars A' A², each consisting of two parallel flat metal bars set edgewise and connected substantially as described, the uprights B B, and the transverse connecting-bars D D and E, all substantially as and for the purpose set forth.

3. The combination of the truck-frame with the body-supporting springs and the vertically-movable caps I I, resting on said springs and carrying the body, all substantially as specified.

4. The combination of the side bars A' A², the springs supported on bar A² exterior to the axles, the caps I, having shanks i playing through bar A', and the bar F, supported on said shanks, substantially as specified.

5. The combination of the truck-frame composed of side bars A' A², uprights B B, and the transverse connecting-bars D D and E, with the car-axles, boxes B', and springs F F, all substantially as set forth.

6. The combination of the truck-frame having compound side bars A' A² with the stirrup-blocks C, springs G, caps I, and bars F, all as and for the purpose set forth.

7. The combination of the truck-frame composed of side bars A' A², the latter being depressed at center, the uprights B B, and transverse bars D D and E, and bolts E', with the car-axle boxes playing between uprights B B, the springs F F, and the car-body-sustaining springs arranged on the truck exterior to the axles, substantially as and for the purposes set forth.

8. The herein-described truck, consisting of the side frames composed of compound bars A' A², uprights B B, and the transverse braces D D and E, brace-bolts E', the stirrup-blocks C C, springs thereon, the vertically-movable caps I, having shanks i playing through bar A', and the body-bars J, all constructed and arranged as and for the purpose described.

In testimony that I claim the foregoing as my own I affix my signature in presence of two witnesses.

BENJAMIN F. MANIER.

Witnesses:
JOHN TAYLOR,
E. A. STANLEY.